United States Patent
Lee et al.

(10) Patent No.: US 7,731,223 B2
(45) Date of Patent: Jun. 8, 2010

(54) AIRBAG MODULE

(75) Inventors: Jung Su Lee, Gyeonggi-do (KR); Gun Woo Kim, Gyeonggi-do (KR)

(73) Assignee: Hyundai Mobis Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/026,832

(22) Filed: Feb. 6, 2008

(65) Prior Publication Data

US 2009/0102170 A1   Apr. 23, 2009

(30) Foreign Application Priority Data

Oct. 22, 2007   (KR) ...................... 10-2007-0105894

(51) Int. Cl.
*B60R 21/217* (2006.01)
(52) U.S. Cl. .................................................. 280/728.2
(58) Field of Classification Search .............. 280/728.2, 280/732, 736, 740
See application file for complete search history.

(56) References Cited

U.S. PATENT DOCUMENTS

| | | | |
|---|---|---|---|
| 5,149,130 A * | 9/1992 | Wooley et al. ........... | 280/743.1 |
| 5,364,123 A * | 11/1994 | Abramczyk et al. ...... | 280/743.1 |
| 5,458,364 A * | 10/1995 | Mueller et al. .......... | 280/728.2 |
| 5,462,305 A * | 10/1995 | Hamada ................... | 280/728.2 |
| 5,511,819 A * | 4/1996 | Spilker et al. ............ | 280/728.2 |
| 5,732,971 A * | 3/1998 | Lutz ........................ | 280/728.2 |
| 5,887,891 A * | 3/1999 | Taquchi et al. ........... | 280/728.2 |
| 5,899,485 A * | 5/1999 | Folsom et al. ............ | 280/728.2 |
| 6,406,056 B2 * | 6/2002 | Yokota .................... | 280/728.2 |
| 2004/0004344 A1 | 1/2004 | Kim et al. | |
| 2004/0036260 A1 | 2/2004 | Song et al. | |
| 2004/0046371 A1 | 3/2004 | Lee et al. | |
| 2005/0035575 A1 | 2/2005 | Lim | |
| 2005/0082793 A1* | 4/2005 | Lee ......................... | 280/728.2 |
| 2005/0173902 A1* | 8/2005 | Boxey ..................... | 280/730.2 |
| 2006/0186644 A1* | 8/2006 | Manire et al. ............ | 280/728.2 |
| 2007/0035110 A1 | 2/2007 | Lee | |
| 2007/0176398 A1* | 8/2007 | Vigeant et al. ........... | 280/728.2 |

* cited by examiner

*Primary Examiner*—Faye M. Fleming
*Assistant Examiner*—Robert A Coker
(74) *Attorney, Agent, or Firm*—Greenblum & Bernstein P.L.C.

(57) ABSTRACT

Disclosed is an airbag module which can improve working efficiency because it is easy to assemble, reduce weight while maintaining sufficient rigidity, and ensure sufficient safety. The airbag module comprises: a cushion assembly including an airbag cushion; an inflator for supplying gas to the airbag cushion to deploy the airbag cushion; a housing for containing the cushion assembly, and having a through hole for arranging the inflator therethrough; and a cushion support for supporting the cushion assembly, and including through rings for passing the inflator therethrough so as to be supported by the inflator arranged through the through hole.

7 Claims, 4 Drawing Sheets

AIRBAG MODULE

BACKGROUND OF THE INVENTION

1. Field of the Invention

The present invention relates to an airbag module for protecting a driver and a passenger upon a vehicle collision.

2. Discussion of the Related Art

Recently, consumers think that the safety of a vehicle, as well as the performance or design of a vehicle, is a very important consideration in choosing a vehicle. Therefore, car manufacturers have established the development of technologies for securing the safety of a vehicle as a primary goal and are devoting themselves to this goal. Under the circumstance of the development of technologies, airbag modules are receiving attention as means for improving the safety of a passenger, and the technologic development for these means are in rapid progress. Also, in recent years, airbag modules are being regarded as an essential item of a vehicle.

However, an airbag module must have sufficient safety because it carries out the function of protecting a passenger by deploying an airbag cushion. For this, strength of more than a predetermined level should be maintained, and thus parts of the airbag module are made of metal material having a large weight. However, this makes the weight of the airbag module larger, thereby decreasing the energy efficiency of the vehicle.

Further, the airbag module is constructed by joining various parts, but the joining process is not easy. Hence, although measures for improving working efficiency have been sought, any proper solution for this has not been secured yet.

SUMMARY OF THE INVENTION

The present invention has been made in an effort to provide an airbag module which can improve working efficiency, and is made of a lightweight material while maintain sufficient strength.

To achieve the foregoing object, there is provided an airbag module according to the present invention, comprising: a cushion assembly including an airbag cushion; an inflator for supplying gas to the airbag cushion to deploy the airbag cushion; a housing for containing the cushion assembly, and having a through hole for arranging the inflator therethrough; and a cushion support for supporting the cushion assembly, and including through rings for passing the inflator therethrough so as to be supported by the inflator arranged through the through hole.

Preferably, the through rings are formed in the same shape as a cross sectional shape of the inflator so that the inflator may be compressed and fitted to the through rings. Preferably, through ring ribs are formed on the surface of the through rings such that the yield stress thereof may be increased. Preferably, through ring rib grooves are formed on the inner surface of the through hole of the housing to keep the gas ejected from the inflator from being leaked out by the compression of the through ring ribs.

A gas inlet and outlet may be formed on the cushion support such that the gas supplied from the inflator can be introduced into the airbag cushion.

The cushion assembly may include a cushion cushion rings to be suspended on the cushion support so as to be supported by the cushion support.

The airbag module may comprise side caps which are fitted to both opposite ends of the inflator arranged through the through hole such that the inflator may be fixed to the housing. Preferably, the side caps are forcedly fitted to the housing. Fixing grooves are formed at the ends of the through hole to which the side caps are fitted, and fixing projections are formed on the surfaces of the side caps such that the side caps may be fitted and fixed to the through hole.

Side cap ribs may be formed on the surfaces of the side caps in order to increase the yield stress of the side caps. Also, side cap rib grooves may be formed in order to prevent the gas supplied from the inflator from being leaked out by the compression of the side cap ribs.

Slots may be formed on the outer surface of the inflator which is to be covered by the side caps, and slot projections may be formed on the side caps so that the side caps may be fitted to the slots.

The present invention has the following effects.

First, the present invention can improve working efficiency because the connection of the airbag module is made easier.

Second, the present invention can increase safety by maintaining sufficient rigidity while reducing the number of parts.

Third, the present invention can reduce self-weight because a strength of a required level can be secured even if the airbag module is made of a lightweight material, such as plastic.

Fourth, the present invention can cut down costs since sufficient rigidity can be maintained even with cheap materials.

Fifth, the present invention allows the airbag cushion to be deployed at the right time by suppressing the leakage of the gas generated from the inflator as much as possible.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
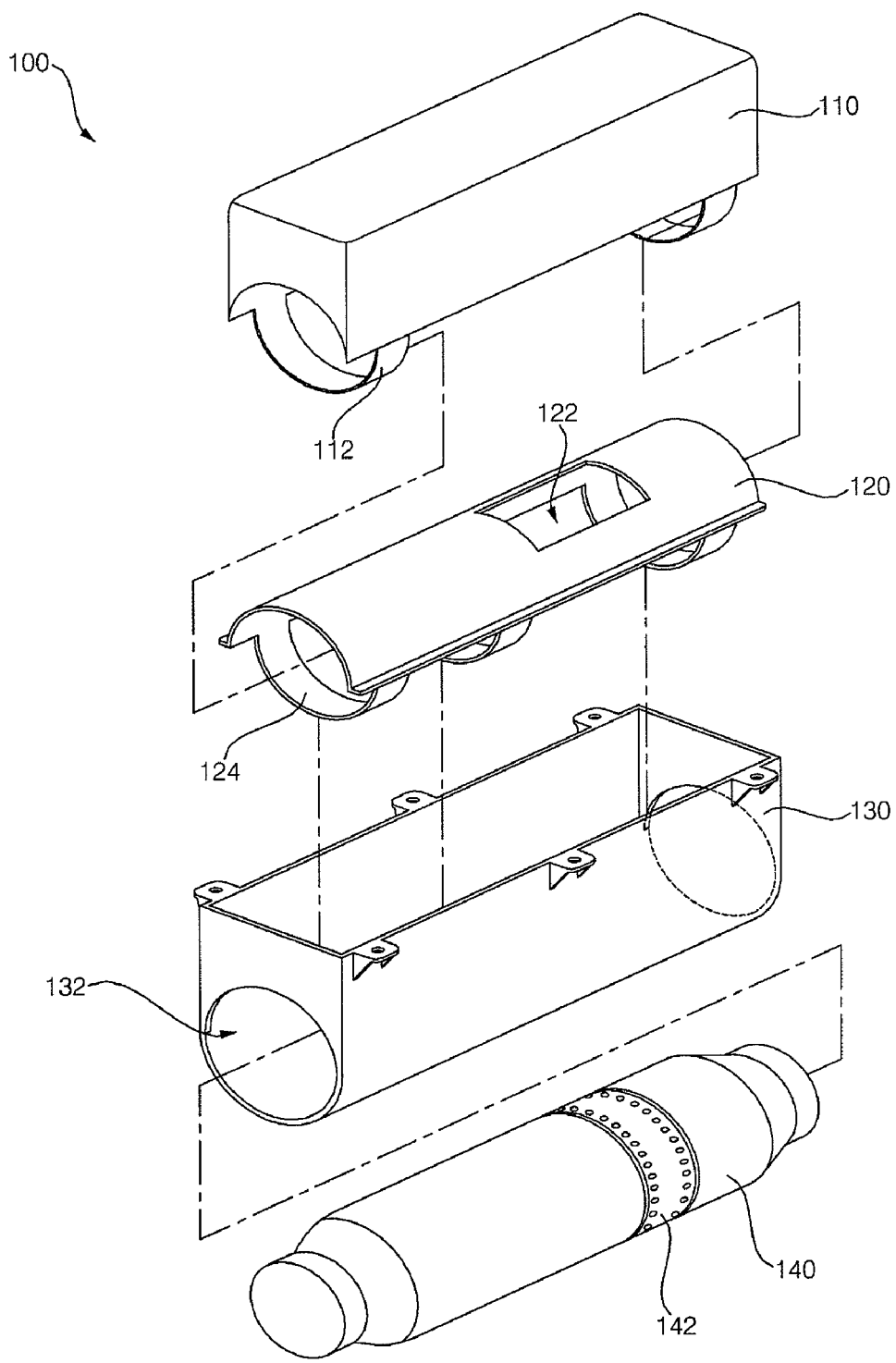
FIG. 1 is an exploded perspective view showing an airbag module according to a first embodiment of the present invention.

Hereinafter, a first embodiment of the present invention will be described with reference to FIG. 1.

An airbag module 100 of this embodiment includes a cushion assembly 110 for accommodating an airbag cushion (not shown) in a folded state, the airbag cushion being deployed at a high speed by an incoming gas upon collision, an inflator 140 for deploying the airbag cushion by supplying, to the airbag cushion (not shown), a high-pressure gas generated by the explosive force of a chemical reaction in a vehicle collision; a housing 130 for containing the cushion assembly 110, and having a through hole 132 for arranging the inflator 140 therethrough; and a cushion support 120 for supporting the cushion assembly 110, and including through rings 124 for passing the inflator 140 therethrough so as to be supported by the inflator arranged through the through hole 132.

The cushion assembly 110 preferably includes cushion rings 112 to be suspended on the cushion support 120 such that it is sufficiently supported by the cushion support 120 to secure its position.

Also, the cushion support 120 preferably includes a gas inlet and outlet 122 formed thereon such that gas supplied from a gas ejection opening 142 of the inflator 140 arranged through the through rings 124 can be supplied to the airbag cushion provided at the cushion assembly 110.

The way the components are joined together in this embodiment will be described.

The cushion rings 112 are suspended and fixed to the cushion support 120 so that the cushion assembly 110 may be supported by the cushion support 120 to secure its position. Then, the cushion support 120 joined to the cushion assembly 110 is contained in the housing 130, and thereafter the inflator 140 is inserted into the through hole 132 so as to pass through both the through hole 132 and the through rings 124, thus fixing the cushion support 120 to the housing 130. Resultantly, the cushion assembly 110 is firmly arranged in the housing 130.

Hereinafter, the advantages of the airbag module in this embodiment will be described.

As discussed above, the airbag module 100 of this embodiment is not fastened by connection means, such as bolts and nuts, so no additional fastening means are required.

Further, if the airbag module is manufactured by connecting means such as bolts and nuts, a local stress concentration is generated in the connected regions. Due to this, it is difficult to manufacture an airbag module by using a material, such as plastic, having a relatively weak rigidity compared with metals but having a small weight. In this embodiment, however, the connection of the airbag module is done by the inflator, which is a component of the airbag module, so there is no room for a local stress concentration. Resultantly, a material, such as plastic, having a weak rigidity but being lightweight can be used.

Figure 2:
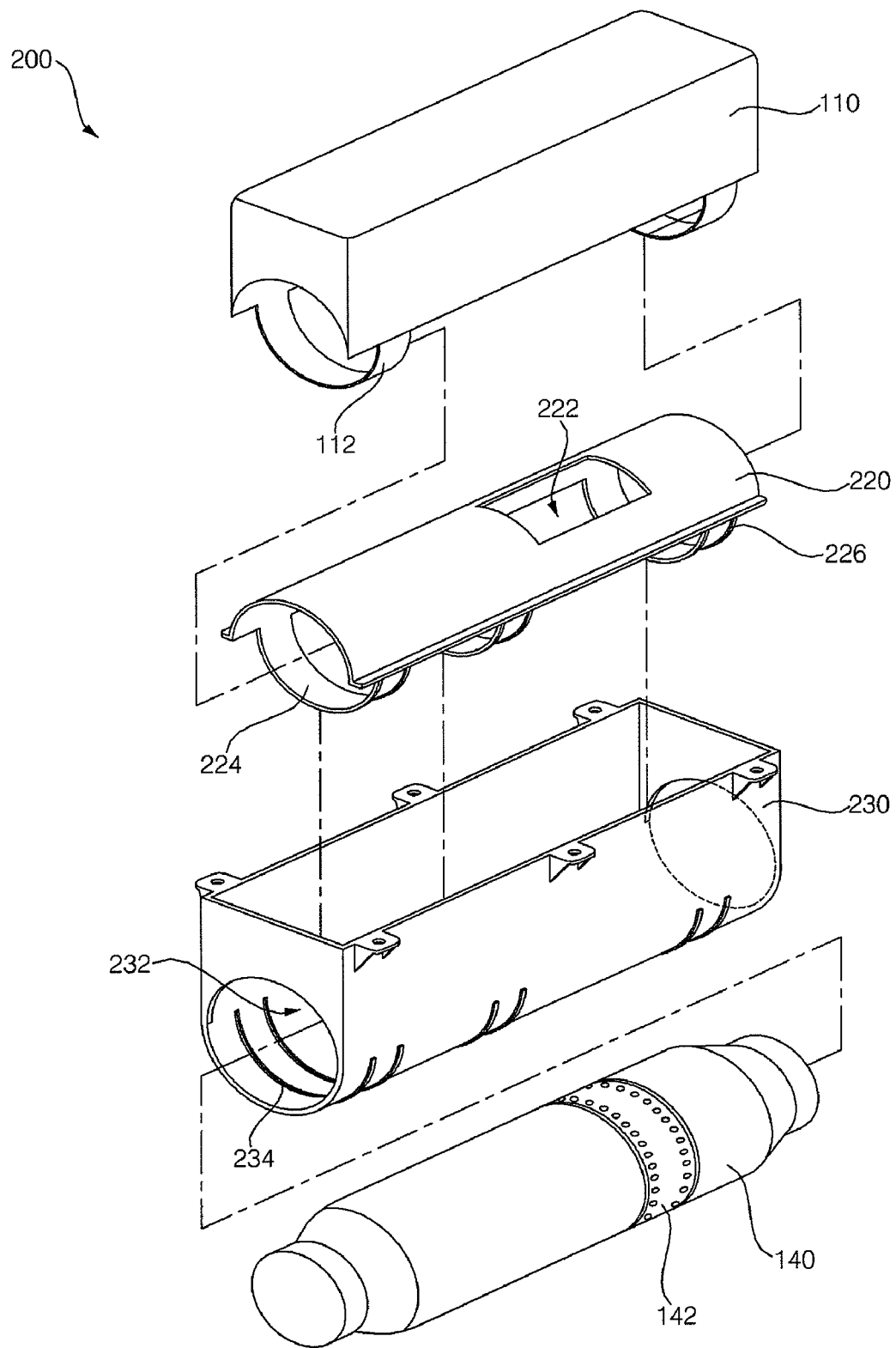
FIG. 2 is an exploded perspective view showing an airbag module according to a second embodiment of the present invention.

Hereinafter, an airbag module 200 according to a second embodiment of the present invention will be described with reference to FIG. 2.

The construction and operation of the airbag module 200 according to this embodiment are substantially identical to those of the airbag module 100 according to the first embodiment, except that through ring ribs 226 are formed on through rings 224, and through ring rib grooves 234 are formed on the inner surface of a through hole 232. Therefore, a repeated description of the airbag module 100 according to the first embodiment of the present invention will be omitted.

Through ring ribs 226 for increasing yield stress are formed on the through rings 224 provided on the cushion support 220 to keep the through rings 224 from being damaged by a stress exerted to the through rings 224 when the inflator 140 is attached through the through rings 224. Further, through ring rib grooves 234 are formed on the inner surface of the through hole 232 of a housing 230 to keep the gas ejected from the inflator 140 from being leaked out by the compression of the through ring ribs 226.

As discussed above, gas is supplied from a gas ejection opening 142 of the inflator 140. Although there is a possibility that the gas might be leaked out between the cushion support and the housing, the through ring ribs 226 and the through ring rib grooves 234 are attached to each other to prevent the leakage of the gas. Therefore, a large amount of gas is supplied to the airbag cushion, and resultantly the deployment speed of the airbag cushion becomes higher, thereby making it possible to deploy the airbag cushion at the right time.

Figure 3:
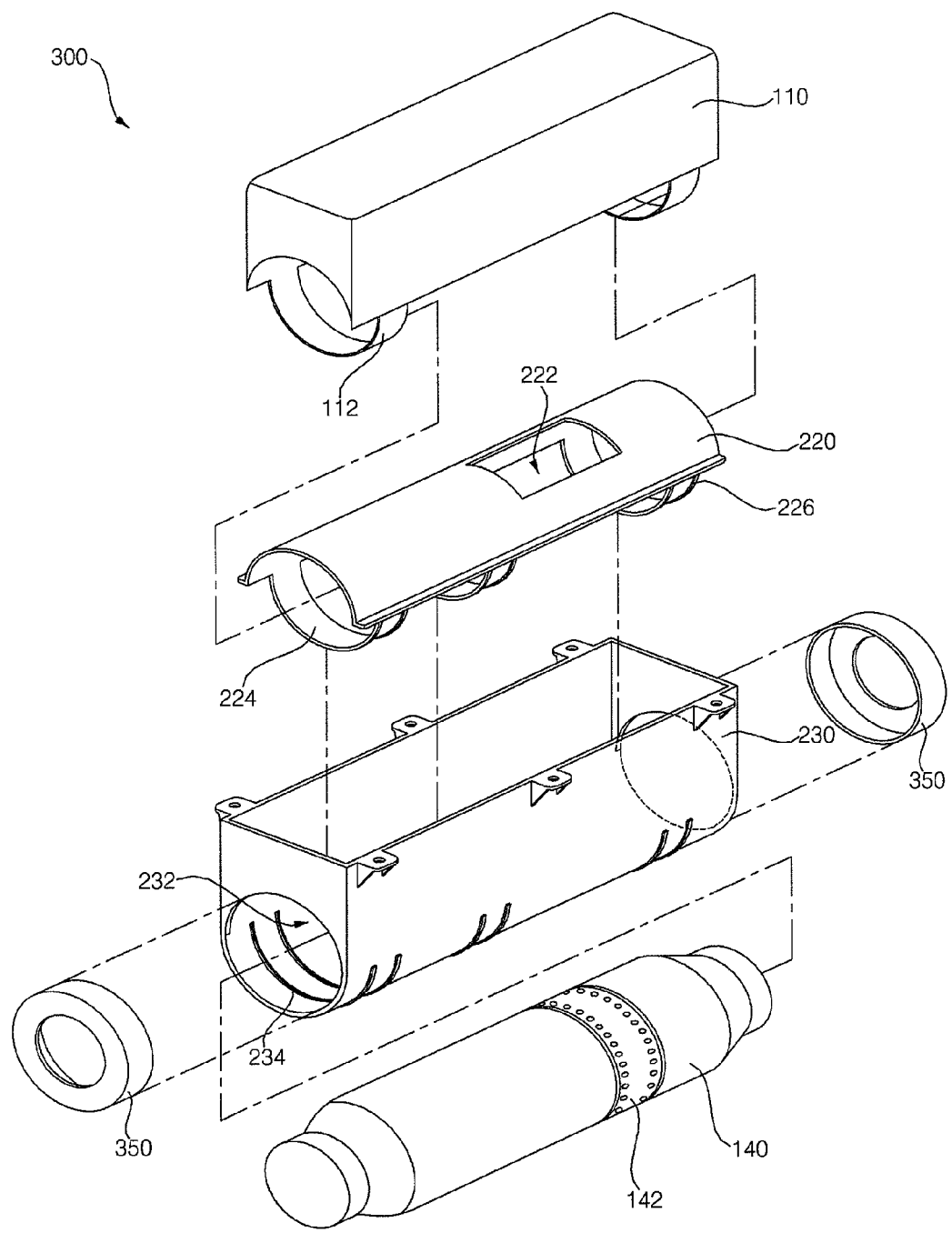
FIG. 3 is an exploded perspective view showing an airbag module according to a third embodiment of the present invention.

Hereinafter, an airbag module 300 according to a third embodiment of the present invention will be described with reference to FIG. 3.

The construction and operation of the airbag module 300 according to this embodiment are substantially identical to those of the airbag module 200 according to the second embodiment, except that the airbag module 300 further includes a side cap 350. Therefore, a repeated description of the airbag module 200 according to the second embodiment of the present invention will be omitted.

The airbag module 300 includes side caps 350 which are fitted to both opposite ends of the inflator 140 arranged through the through hole 232 such that the inflator 140 may be sufficiently fixed to the housing 230.

By including the side caps 350, the inflator 140 is pushed back in a direction that the inflator 140 passes through the through hole 232, thereby preventing the airbag module from being disconnected. Also, if the side caps 350 are arranged to be forcedly fitted into the housing 230, this prevents the gas ejected from the inflator from being leaked out through the through hole 232, thereby ensuring the deployment of the airbag cushion at the right time.

Figure 4:
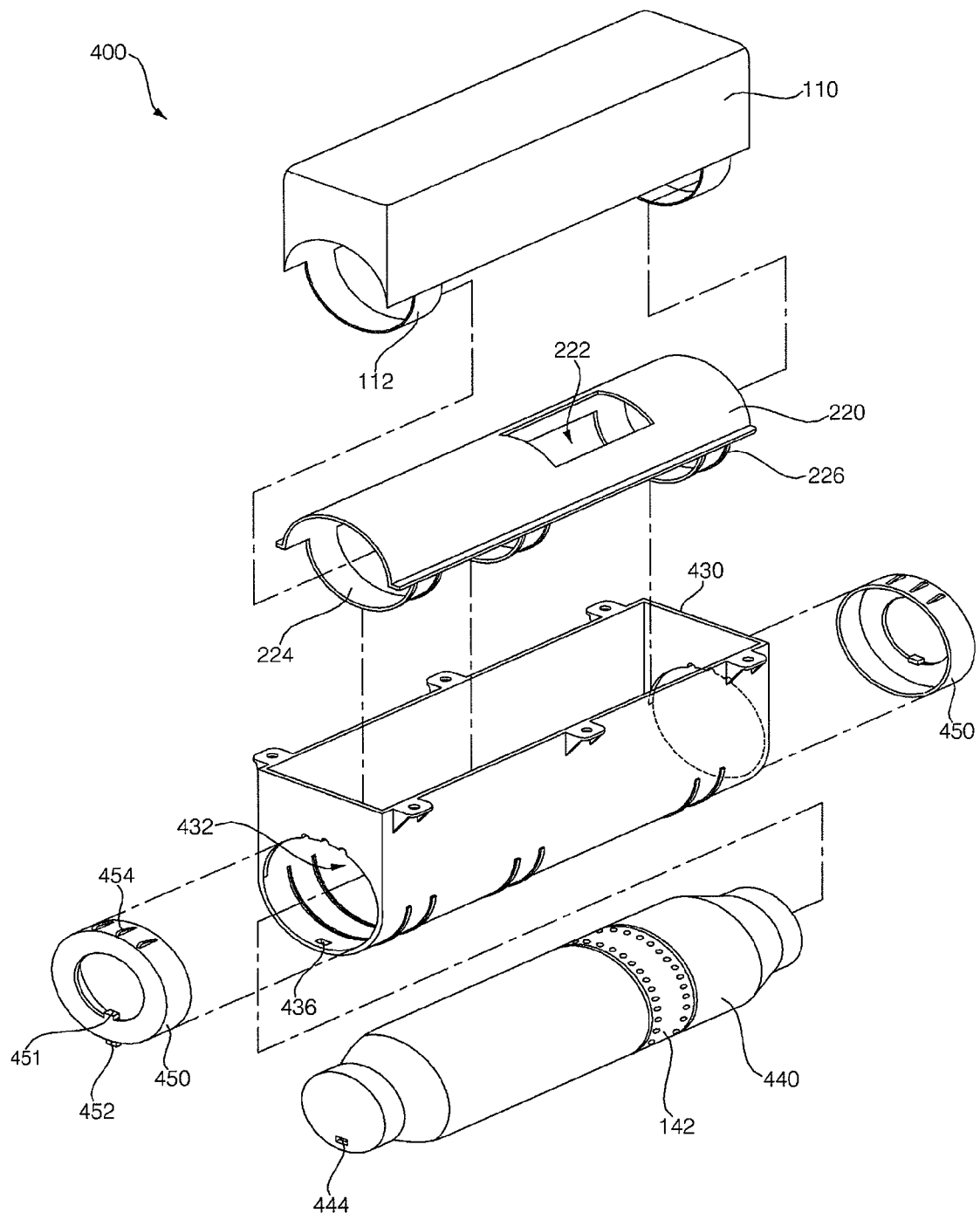
FIG. 4 is an exploded perspective view showing an airbag module according to a fourth embodiment of the present invention.

Hereinafter, an airbag module 400 according to a fourth embodiment of the present invention will be described with reference to FIG. 4.

The construction and operation of the airbag module 400 according to this embodiment are substantially identical to those of the airbag module 300 according to the third embodiment, except for the construction of side caps 450 and the shape of the inner surface of a through hole. Therefore, a repeated description of the airbag module 300 according to the third embodiment of the present invention will be omitted.

In the airbag module 400 according to this embodiment, fixing grooves 436 are formed at the ends of the through hole 432 to which the side caps 450 are fitted, and fixing projections 452 are formed on the surfaces of the side caps 450 such that the side caps 450 may be fitted and fixed to the through hole 432.

Optionally, side cap ribs 454 may be formed on the surfaces of the side caps 450 in order to increase the yield stress of the side caps 450 and strengthen the rigidity of the side caps 450. Also, side cap rib grooves 432 capable of compressing the side cap ribs 454 may be formed in order to prevent the gas supplied from the inflator 440 from being leaked out along the through hole 432.

Optionally, slots 444 may be formed on the outer surface of an inflator 440 so as to prevent the inflator 440 from rocking or prevent the attachment thereof from becoming incomplete, and slot projections 451 may be formed on the side caps 450 so that the side caps 450 may be fitted to the slots 444.

As described above, the present invention has been described with reference to the embodiment shown in the drawings, but it is just for illustration only and those skilled in the art will understand that there are various modifications and equivalent other embodiments therefrom. Accordingly, the sincere technical scope of the invention should be defined based on the technical spirit of the appended claims.

The present invention can be used in the technology of development of an airbag module that secures the safety of a passenger in a vehicle collision.

What is claimed is:

1. An airbag module, comprising:
a cushion assembly including an airbag cushion:
an inflator which supplies gas to the airbag cushion to deploy the airbag cushion;

a housing which contains the cushion assembly, the housing having a through hole for arranging the inflator therethrough; and a cushion support which supports the cushion assembly, the cushion support including through rings for passing the inflator therethrough so as to be supported by the inflator arranged through the through hole, wherein through ring ribs are formed on a surface of the through rings such that yield stress thereof may be increased, and wherein through ring rib grooves are formed on the inner surface of the through hole of the housing to keep the gas ejected from the inflator from being leaked out by compression of the through ring ribs.

2. An airbag module, comprising:

a cushion assembly including an airbag cushion:

an inflator which supplies gas to the airbag cushion to deploy the airbag cushion;

a housing which contains the cushion assembly, the housing having a through hole for arranging the inflator therethrough;

a cushion support which supports the cushion assembly, the cushion support including through rings for passing the inflator therethrough so as to be supported by the inflator arranged through the through hole; and side caps which are fitted to both opposite ends of the inflator arranged through the through hole such that the inflator may be fixed to the housing.

3. The airbag module of claim 2, wherein the side caps are forcedly fitted to the housing.

4. The airbag module of claim 2, wherein fixing grooves are formed at the ends of the through hole to which the side caps are fitted, and fixing projections are formed on the surfaces of the side caps such that the side caps may be fitted and fixed to the through hole.

5. The airbag module of claim 2, wherein side cap ribs are formed on the surfaces of the side caps in order to increase the yield stress of the side caps.

6. The airbag module of claim 5, wherein side cap rib grooves are formed in order to prevent the gas supplied from the inflator from being leaked out by compression of the side cap ribs.

7. The airbag module of claim 2, wherein slots are formed on an outer surface of the inflator which is to be covered by the side caps, and slot projections may be formed on the side caps so that the side caps may be fitted to the slots.

\* \* \* \* \*